United States Patent
Horikawa et al.

(10) Patent No.: US 6,422,174 B1
(45) Date of Patent: Jul. 23, 2002

(54) DRINKING WATER ADDITIVE FOR BIRDS AND METHOD OF ADMINISTERING THE SAME

(76) Inventors: Hiroshi Horikawa, 117-924, Awacho, Kuroiso-shi, Tochigi 325-0073; Kazuya Iwasaki, Kopo S1 211, 77-192, Suehirocho, Kuroiso-shi, Tochigi 325-0061; Hiroshi Miyazaki, 2-22-11, Kamishakujii, Nerima-ku, Tokyo 177-0044; Toshihiro Marubashi, 1928-9, Hashiecho, Isezaki-shi, Gunma 372-0001, all of (JP)

(*) Notice: Subject to any disclaimer, the term of this patent is extended or adjusted under 35 U.S.C. 154(b) by 0 days.

(21) Appl. No.: 09/509,759
(22) PCT Filed: Feb. 17, 1998
(86) PCT No.: PCT/JP98/00638
§ 371 (c)(1), (2), (4) Date: Apr. 10, 2000
(87) PCT Pub. No.: WO99/18809
PCT Pub. Date: Apr. 22, 1999

(30) Foreign Application Priority Data

Oct. 9, 1997 (JP) ............................................. 9-277626

(51) Int. Cl.⁷ ............................................. A01K 29/00
(52) U.S. Cl. ...................... 119/174; 424/442; 424/93.1; 426/635
(58) Field of Search .................... 119/174; 424/442, 424/93; 4/DIG. 1; 426/635; A23K 1/00

(56) References Cited

U.S. PATENT DOCUMENTS

| | | | |
|---|---|---|---|
| 3,857,948 A | * 12/1974 | Tanaka et al. | 424/283 |
| 4,689,226 A | * 8/1987 | Nurmi et al. | 424/93 |
| 4,919,936 A | * 4/1990 | Iwanami et al. | 424/442 |
| 5,308,615 A | * 5/1994 | DeLoach et al. | 424/93 |
| 5,340,577 A | * 8/1994 | Nisbet et al. | 424/93.21 |
| 5,863,572 A | * 1/1999 | Iwasaki | 426/2 |

FOREIGN PATENT DOCUMENTS

| | | | |
|---|---|---|---|
| JP | 59-187743 | 10/1984 | ............ A23K/1/18 |
| JP | 63-238020 | 10/1988 | |
| JP | 3-79988 | 12/1991 | |
| JP | 5-146260 | 6/1993 | ............ A23K/1/18 |
| JP | 2528055 | 6/1996 | |
| JP | 08214790 | 8/1996 | |
| JP | 8-214790 | 8/1996 | ............ A23K/1/18 |
| JP | 9-163934 | 6/1997 | ............ A23K/1/18 |
| WO | WO 94/21140 | * 9/1994 | ............ A23K/1/16 |

* cited by examiner

Primary Examiner—Peter M. Poon
Assistant Examiner—Andrea M. Valenti
(74) Attorney, Agent, or Firm—Darby & Darby

(57) ABSTRACT

Disclosed is a poultry drinking water additive containing live bacteria of the genus Bacillus and monosaccharides, which can alleviate body weight loss of poultry for meat production after feed withdrawal before slaughter, and which can reduce harmful bacteria such as of the genus Salmonella in the intestine of poultry for meat production and layers during the period of fasting by feed withdrawal. Also disclosed are a method for orally administering the poultry drinking water additive to poultry, a method for alleviating body weight loss of poultry for meat production using this method, and a method for reducing harmful bacteria in the intestine of poultry for meat production or layers.

11 Claims, 1 Drawing Sheet

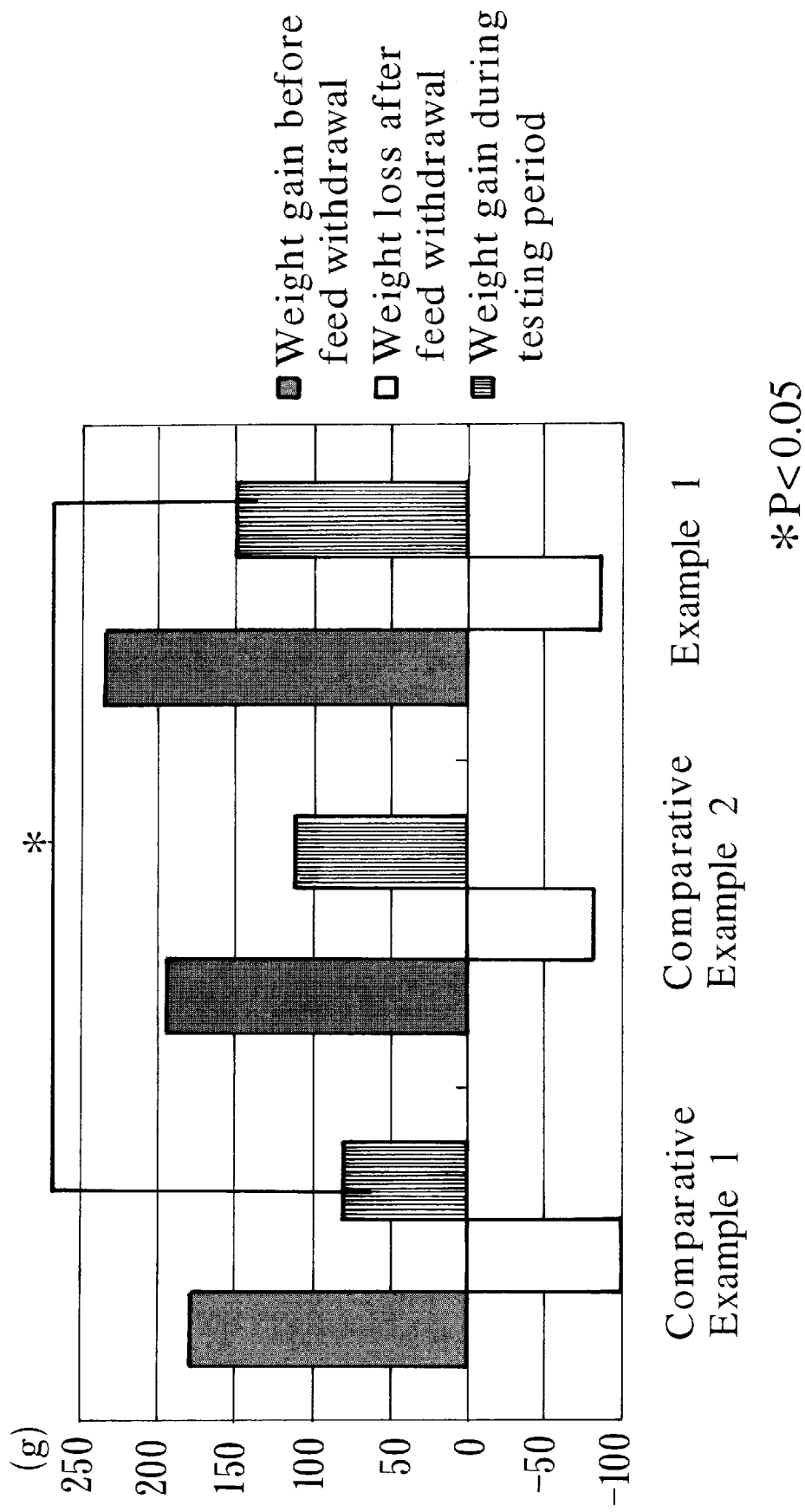

1

DRINKING WATER ADDITIVE FOR BIRDS AND METHOD OF ADMINISTERING THE SAME

FIELD OF ART

The present invention relates to a poultry drinking water additive which is effective in alleviating body weight loss of poultry, in particular poultry for meat production, after feed withdrawal before slaughter of the poultry, and which is effective in reducing harmful bacteria, such as of the genus Salmonella, in the intestine of poultry. The present invention also relates to a method for administering such an additive to poultry, a method for alleviating body weight loss of poultry for meat production, as well as a method for reducing harmful bacteria in the intestine of poultry for meat production or layers.

BACKGROUND ART

It is known that live bacteria of the genus Bacillus have effects of improving physical condition of poultry (JP-B-61-59092) and suppressing pathogenic bacteria (JP-A-9-163937). In particular, it is already known that *Bacillus subtilis* C-3102 (FERM BP-1096) is useful for promoting weight gain of poultry (JP-B-3-79988) and for reducing bacteria of the genus Salmonella in the intestine of poultry (Japanese Patent No. 2528055).

However, it is merely known that live bacteria of the genus Bacillus exhibit such effect when the bacteria are mixed in with powdered feed. It is not known to add the live bacteria to drinking water, much less to administer the live bacteria to poultry for meat production after feed withdrawal before slaughter.

It is also known that declining in body weight gain of poultry for meat production because of decreased feed intake due to heat stress may be prevented by administering to the poultry drinking water containing 1 to 10 weight % monosaccharides and optionally 0.1 to 1.0 weight % sodium bicarbonate (JP-A-8-214790).

When the slaughter of poultry for meat production results in contamination of the carcass with the contents of the intestine, bacteria constituting the intestinal flora of poultry may stick to the meat portion and grow during distribution, some of which may cause food poisoning. It is thus desirable to start suppressing growth of such harmful intestinal bacteria, including bacteria of the genus Salmonella, at as low level as possible while poultry are still alive. For this purpose, feed having the effect of suppressing harmful intestinal bacteria is sometimes given to poultry. On the other hand, in order to prevent contamination of poultry meat with intestinal contents upon slaughter, poultry are made to fast for about one day before slaughter by withdrawing feed ("feed withdrawal") for minimizing the amount of intestinal contents of the poultry before slaughter. However, the feed withdrawal before slaughter results in body weight loss and thus in reduction of productivity. Further, poultry for meat production eat their own feces when they are starved, which, in combination with the fasting stress, causes alteration in the balance of intestinal flora. As a result, harmful intestinal bacteria such as of the genus Salmonella tend to increase rapidly.

The "feed withdrawal" is also applied to layers. For example, for remedying decrease in the number of eggs to be laid by layers, the layers are made to fast for about one week by withdrawing feed and given only drinking water during that period to cause the layers to lay more eggs. In such period, the layers molt their feathers. Accordingly, this is called a forced molting period. In the forced molting period, like poultry for meat production, layers also eat their own feces since they are starved, which, in combination with the fasting stress, causes alteration in the balance of intestinal flora. As a result, harmful intestinal bacteria such as of the genus Salmonella tend to increase rapidly, causing contamination of produced eggs with the harmful bacteria.

Consequently, it is demanded to develop a method for preventing growth of harmful intestinal bacteria in poultry while the body weight loss of the poultry after feed withdrawal before slaughter is alleviated and intestinal contents are minimized, and a method for preventing growth of harmful intestinal bacteria in layers during the forced molting period.

DISCLOSURE OF THE INVENTION

It is an object of the present invention to provide a poultry drinking water additive and a method for administering such additive which can alleviate body weight loss of poultry for meat production after feed withdrawal before slaughter, and which can reduce harmful bacteria, such as bacteria of the genus Salmonella, in the intestine of poultry for meat production and layers during the feed withdrawal period.

It is another object of the present invention to provide a method for alleviating body weight loss of poultry for meat production which realizes effective alleviation of body weight loss of poultry for meat production after feed withdrawal before slaughter.

It is another object of the present invention to provide a method for reducing harmful bacteria in the intestine of poultry for meat production which realizes effective reduction of harmful bacteria such as bacteria of the genus Salmonella, in the intestine of poultry for meat production after feed withdrawal before slaughter.

It is another object of the present invention to provide a method for reducing harmful bacteria in the intestine of layers which realizes effective reduction of harmful bacteria, such as bacteria of the genus Salmonella, in the intestine of layers during the forced molting period.

According to the present invention, there is provided a poultry drinking water additive comprising live bacteria of the genus Bacillus and monosaccharides.

According to the present invention, there is provided use of a poultry drinking water additive comprising live bacteria of the genus Bacillus and monosaccharides for preparing a poultry drinking water mixture.

According to the present invention, there is provided a method for administering the poultry drinking water additive mentioned above comprising orally administering to poultry a poultry drinking water mixture prepared by dissolving and suspending the poultry drinking water additive in poultry drinking water.

According to the present invention, there is provided a method for alleviating body weight loss of poultry for meat production comprising orally administering to poultry for meat production an effective amount of a poultry drinking water mixture for at least one day immediately preceding slaughter, said effective amount being effective for alleviating body weight loss of the poultry after feed withdrawal before slaughter, said poultry drinking water mixture having been prepared by dissolving and suspending in poultry drinking water the poultry drinking water additive.

According to the present invention, there is also provided a method for reducing harmful bacteria in intestine of poultry for meat production comprising orally administering to poultry for meat production an effective amount of a poultry drinking water mixture for at least one day immediately preceding slaughter, said effective amount being effective for reducing harmful bacteria in intestine of the poultry after feed withdrawal before slaughter, said poultry drinking water mixture having been prepared by dissolving and suspending in poultry drinking water the poultry drinking water additive.

According to the present invention, there is further provided a method for reducing harmful bacteria in intestine of a layer comprising orally administering to a layer an effective amount of a poultry drinking water mixture for at least one day during forced molting period of the layer, said effective amount being effective for reducing harmful bacteria in intestine of the layer during forced molting period, said poultry drinking water mixture having been prepared by dissolving and suspending in poultry drinking water the poultry drinking water additive.

BRIEF DESCRIPTION OF THE DRAWINGS

FIG. 1 is a graph showing the results of the tests conducted in Example 2 and Comparative Examples 1 and 2.

PREFERRED EMBODIMENTS OF THE INVENTION

The poultry drinking water additive of the present invention contains live bacteria of the genus Bacillus and monosaccharides as active ingredients, and is dissolved and suspended in poultry drinking water before use and administered orally to poultry in the form of a poultry drinking water mixture. The additive is particularly effective for alleviating body weight loss of poultry for meat production after feed withdrawal before slaughter, and for reducing or suppressing growth of harmful bacteria in the intestine of poultry for meat production after feed withdrawal before slaughter, or of layers during the forced molting period.

The live bacteria of the genus Bacillus include live bacteria of strains having confirmed safety such as those of human food grade or those collected from healthy livestock or poultry. For example, *Bacillus subtilis*, *Bacillus coagulans*, *Bacillus licheniformis*, *Bacillus pumilus*, or *Bacillus lentus* may be used. Among these, *Bacillus subtilis* C-3102 (deposited in Fermentation Research Institute, Agency of Industrial Science and Technology, Japan, under No. 1096)(FERM BP-1096, deposited Jun. 28, 1986) is particularly preferred for its excellent capability of increasing body weight of poultry and of suppressing growth of harmful intestinal bacteria. *Bacillus subtilis* C-3102 has already been used as a probiotic for feedstuffs, and its safety has been confirmed. Further, when *Bacillus subtilis* used for producing sticky fermented soybeans (natto) is used, sticky property of the fermented product due to polyglutamic acid and fructan should be taken into account since this property affects the operation efficiency in the production process. Although bacteria of the genus Bacillus also include bacteria species which will cause food poisoning, such as pathogenic Bacillus cereus, such food poisoning bacteria species are excluded from the scope of the present invention since they do not fulfill the objects of the present invention. Accordingly, it is important to select bacteria species that will not cause food poisoning.

The live bacteria of the genus Bacillus may be cultured in solid or liquid medium containing a carbon source, a nitrogen source, inorganic substances, vitamins, amino acids and the like, which are commonly used for culturing microorganisms. The carbon source is not particularly limited as long as it is a carbon compound which can be assimilated by the culturing bacteria, and may be glucose, sucrose, starch, or molasses. The nitrogen source may be, for example, peptone, meat extract, hydrolysate of casein, or ammonium sulfate. Optionally, salts such as phosphates, magnesium, sodium, potassium, iron, or manganese; vitamins; amino acids; a deforming agent; or a surface active agent may be added to the medium.

The bacteria are preferably cultured under aerobic conditions with the initial pH of the medium being preferably 5 to 9, more preferably 6 to 8, at preferably 20 to 50° C., more preferably 30 to 45° C. for 12 hours to 7 days.

Any of the culture per se containing the cultured live bacteria of the genus Bacillus, condensate thereof, and the bacteria isolated from the culture, may be used as the active ingredient of the additive. The active ingredient preferably contains $10^6$ to $10^{11}$ cells of live bacteria, i.e., spores and/or vegetative cells, per gram of the active ingredient. The live bacteria of the genus Bacillus per se as the active ingredient, or optionally mixed with a carrier, may be dried or formulated, and then mixed with the monosaccharides to be discussed later, thereby facilitating storage and transportation. Alternatively, the live bacteria of the genus Bacillus may be mixed with monosaccharides before they are mixed with a carrier and formulated. The carrier is not particularly limited, but is preferably water soluble. Preferred examples of the carrier may include dextrin, succrose, lactose, and galactose. When monosaccharides are selected as the carrier, they also function as the active ingredient.

The other active ingredient of the poultry drinking water additive of the present invention, monosaccharides, in combination with the live bacteria of the genus Bacillus, exhibits the effects of alleviating body weight loss of poultry, as well as increasing blood glucose level of poultry to mitigate their hunger, thereby restraining or preventing poultry from eating their own feces to eliminate the cause of growth of harmful intestinal bacteria. Examples of the monosaccharides may include glucose, fructose, galactose, and xylose.

In the poultry drinking water additive of the present invention, the live bacteria of the genus Bacillus and monosaccharides may be in the form of a dried blend at a particular ratio, or a formulation prepared by a mixture of live bacteria of the genus Bacillus and monosaccharides at a particular ratio. Alternatively, the formulation of the live bacteria and the formulation of monosaccharides may be packed separately, and dissolved and suspended in drinking water at a particular ratio before use. This particular ratio of the live bacteria and the monosaccharides dissolved and suspended in poultry drinking water is preferably such that the number of live bacteria of the genus Bacillus is preferably $10^4$ to $10^8$ cells, more preferably about $10^5$ to $10^8$ cells per milliliter of the drinking water, and the concentration of the monosaccharides is preferably 1 to 10 weight % of the total weight of the drinking water and the monosaccharides together. If the number of live bacteria is less than $10^4$ cells/ml, desired effect may not be achieved sufficiently, whereas even if the number of live bacteria exceeds $10^8$ cells/ml, no further improvement in the effect cannot be expected, thus not being economical and preferable. If the concentration of the monosaccharides is less than 1 weight %, the effects of alleviating body weight loss and increasing glucose level may not be sufficiently exhibited, whereas if the concentration exceeds 10 weight %, the viscosity of the drinking water is increased, which may cause poultry to uptake decreased amount of the drinking water. Further, when the live bacteria and the monosaccharides are blended in advance, or the formulation is prepared from the mixture of the live bacteria and the monosaccharides before they are dissolved and suspended in poultry drinking water, the mixing ratio of the two components is not particularly limited, but preferably $10^6$ to $10^{10}$ cells of live bacteria of the genus Bacillus are mixed with 1 to 10 g of the monosaccharides.

The poultry drinking water additive of the present invention may be used by dissolving and suspending the additive in poultry drinking water to prepare a poultry drinking water mixture of preferred concentration, and orally administering the drinking water mixture to poultry. Further, for example, an appropriate amount of vitamins, minerals, amino acids, flavoring agents, souring agents, sodium bicarbonate, emulsifiers, stabilizers, or surface active agents may optionally be added to the poultry drinking water mixture. Preferable timing for administering this poultry drinking water mixture is to be described later, but is not necessarily limited thereto.

The method of administering the additive, the method for alleviating body weight loss of poultry for meat production, the method for reducing harmful intestinal bacteria in poultry for meat production, and the method for reducing harmful intestinal bacteria in layers of the present invention are all characterized by orally administering to poultry a drinking water mixture prepared by dissolving and suspending the additive in poultry drinking water. In particular, to poultry for meat production, an effective amount of the additive is orally administered, i.e. administered in drinking water, for at least one day immediately preceding slaughter, whereas to layers, an effective amount of the additive is orally administered, i.e., administered in drinking water, for at least one day during the forced molting period.

The oral administration to poultry may be effected, for example, by continuous administration or intermittent administrations during the predetermined administration period of the poultry drinking water mixture prepared by dissolving and suspending the poultry drinking water additive of the present invention in poultry drinking water at a particular mixing ratio. The number of live bacteria of the genus Bacillus in the poultry drinking water mixture is preferably $10^4$ to $10^8$ cells/ml, more preferably about $10^5$ to $10^8$ cells/ml, and the concentration of the monosaccharides is preferably 1 to 10 weight % of the total weight of the poultry drinking water and the monosaccharides together. The administration for at least one day immediately preceding the slaughter may be sufficient for poultry for meat production, but usually daily administration for two to seven consecutive days immediately preceding the slaughter may be effective. For example, the administration after the feed withdrawal may be sufficient, but additional administration before the feed withdrawal may provide enhanced increase in body weight and preliminary balancing of the intestinal flora, thus being preferred. It is preferable and the most economical to start daily administration of effective dose one to two days before the feed withdrawal, and continue the daily administration of effective dose even after the feed withdrawal. In the case of layers, administration of effective dose for at least one day during the forced molting period may be sufficient, but additional administration before or after the forced molting period may also be effective. Daily and continuous administration of effective dose for a particular period of or the entire period of the forced molting period is preferred.

The effective dose may suitably be decided, but usually a daily dose of 200 to 500 ml of the poultry drinking water mixture per bird per day may be appropriate before and after the feed withdrawal for alleviating body weight loss and reducing harmful intestinal bacteria.

The poultry drinking water additive of the present invention contains the live bacteria of the genus Bacillus and the monosaccharides. Therefore, by orally administering to poultry for meat production an effective amount of the additive for at least one day immediately preceding the slaughter of the poultry, the body weight loss of the poultry may be alleviated, harmful intestinal bacteria in the poultry are reduced, and contamination of meat portion with food poisoning bacteria such as of the genus Salmonella upon slaughter is prevented. Further, by orally administering to layers an effective amount of the additive for at least one day during the forced molting period of the layers, harmful intestinal bacteria in the poultry are reduced, and adverse effect of the harmful bacteria on eggs to be deposited is reduced or eliminated.

EXAMPLES

The present invention will now be explained in more detail with reference to Examples, but the present invention is not limited thereto.

Example 1

Male broilers at 48 days of age were divided into three groups of 10 broilers each of similar weight.

Poultry drinking water mixture A was prepared by mixing the poultry drinking water additive in poultry drinking water so that the mixture A contained 4 weight % glucose and $6 \times 10^5$ CFU/ml of *Bacillus subtilis* C-3102.

The first group of male broilers of similar weight were fed with normal solid feed (marketed by ITOCHU FEED MILLS CO., LTD., trade name "BROACE F") and allowed free and continuous access to the poultry drinking water mixture A for the first two days of the test. On the subsequent day, feeding with the normal solid feed was withdrawn, and only the drinking water mixture A was continuously given for the day. Body weight gain in the first two days of the test (body weight gain before feed withdrawal), body weight loss in the day of feed withdrawal (body weight loss after feed withdrawal), and body weight gain after three day testing period (body weight gain during the testing period) were measured. The results are shown in FIG. 1 as the average value for the broilers.

Comparative Examples 1 and 2

Each of the second and third groups of the male broilers of the similar weight divided in Example 1 were placed under the same testing conditions as in Example 1 except that the drinking water mixture A was replaced with water (Comparative Example 1) or poultry drinking water mixture B containing 4 weight % glucose (Comparative Example 2), respectively, and the change in the body weight of the broilers was measured. The results are shown in FIG. 1.

FIG. 1 shows that the body weight gain in the two days before the feed withdrawal and the body weight gain after the three day testing period were both largest with the group given the drinking water mixture A (Example 1), then with the group given the drinking water mixture B (Comparative Example 2), and the smallest with the group given water (Comparative Example 1). Therefore, the group received the drinking water mixture A or B were larger in body weight gain while fed with the solid feed, and smaller in body weight loss after the withdrawal of the solid feed, than the group given water. Further, the body weight gain of the group given the drinking water mixture A was larger, while fed with the normal feed, than the body weight gain of the group given the drinking water mixture B, which indicated that the former group provides higher ultimate productivity.

Example 2 and Comparative Example 3

A field experiment was conducted on broilers at 54 days of age. First, 30 samples of fecal droppings were collected from each poultry house to preliminarily confirm that no remarkable difference in the amount of Salmonella bacteria was detected among the poultry houses prior to the experiment. The broilers were allowed free access to both solid feed (marketed by ITOCHU FEED MILLS CO., LTD., trade name "BROACE F") and the drinking water mixture A prepared in Example 1 (Example 2) or water (Comparative Example 3) on the first day of the experiment. On the second day, the feeding with the solid feed was withdrawn, and only the drinking water mixture A (Example 2) or water (Comparative Example 3) was given to the broilers for the whole day (feed withdrawal period), and the broilers were slaughtered on the third day. After the slaughter, 30 samples of cecal contents were collected from each broiler in the slaughterhouse, and tested for Salmonella bacteria. The results are shown in Table 1.

It is seen from the results in Table 1 that the number of subjects in which Salmonella was detected and the number of bacteria detected in the subjects were significantly lower with the group given the drinking water mixture A (Example 2) than the group given water (Comparative Example 3) with the significance level of 5 %. It is understood from Example 2 that the number of subjects in which Salmonella was detected and the number of bacteria detected in the subjects could be significantly reduced under the practical conditions of commercial broiler farms by administering to the poultry a combination of the live bacteria of the genus Bacillus, which suppress disturbance in the intestinal flora, and the monosaccharides, which raise the blood glucose level of the broilers and suppress coprophagy.

TABLE 1

|  | Number of Subjects in Which Salmonella Was Detected | Number of Bacteria Detected ($\log_{10}$) |
| --- | --- | --- |
| Example 2 | 7/30* | 3.98 ± 0.40* |
| Comparative Example 1 | 16/30 | 4 55 ± 0.66 |

*$P < 0.05$

What is claimed is:

1. A method for alleviating body weight loss of poultry for meat production after feed withdrawal comprising:
   orally administering to poultry for meat production an effective amount of a poultry drinking water mixture after withdrawal of solid feed for at least one day immediately preceding slaughter, said effective amount being effective for alleviating body weight loss of the poultry after feed withdrawal before slaughter, said poultry drinking water mixture having been prepared by dissolving and suspending in poultry drinking water a poultry drinking water additive comprising live bacteria of the genus Bacillus and monosaccharides.

2. The method of claim 1 wherein said poultry drinking water mixture is orally administered, after said withdrawal of solid feed, daily to the poultry for meat production for two to seven successive days immediately preceding slaughter in an amount effective for alleviating body weight loss of the poultry after feed withdrawal before slaughter.

3. The method of claim 1, wherein said live bacteria of the genus Bacillus are live bacteria of the species *Bacillus subtilis*.

4. The method of claim 3, wherein said live bacteria of the species *Bacillus subtilis* are live bacteria of the strain *Bacillus subtilis* C-3102 (FERM BP-1096).

5. A method for reducing harmful bacteria in intestine of poultry for meat production after feed withdrawal comprising:
   orally administering to poultry for meat production an effective amount of a poultry drinking water mixture after withdrawal of solid feed for at least one day immediately preceding slaughter, said effective amount being effective for reducing harmful bacteria in intestine of the poultry after feed withdrawal before slaughter, said poultry drinking water mixture having been prepared by dissolving and suspending in poultry drinking water a poultry drinking water additive comprising live bacteria of the genus Bacillus and monosaccharides.

6. The method of claim 5 wherein said poultry drinking water mixture is orally administered, after said withdrawal of solid feed, daily to the poultry for meat production for two to seven successive days immediately preceding slaughter in an amount effective for reducing harmful bacteria in intestine of the poultry after feed withdrawal before slaughter.

7. The method of claim 5, wherein said live bacteria of the genus Bacilllus are live bacteria of the species *Bacillus subtilis*.

8. The method of claim 7, wherein said live bacteria of the species *Bacillus subtilis* are live bacteria of the strain *Bacillus subtilis* C-3102 (FERM BP-1096).

9. A method for reducing harmful bacteria in intestine of a layer during forced molting period comprising:
   orally administering to a layer an effective amount of a poultry drinking water mixture for at least one day during forced molting period of the layer after withdrawal of solid feed, said effective amount being effective for reducing harmful bacteria in intestine of the layer during forced molting period, said poultry drinking water mixture having been prepared by dissolving and suspending in poultry drinking water a poultry drinking water additive comprising live bacteria of the genus Bacillus and monosaccharides.

10. The method of claim 9, wherein said live bacteria of the genus Bacililus are live bacteria of the species *Bacillus subtilis*.

11. The method of claim 10, wherein said live bacteria of the species *Bacillus subtilis* are live bacteria of the strain *Bacillus subtilis* C-3102 (FERM BP-1096).

* * * * *